United States Patent [19]

Toganoh et al.

[11] Patent Number: 4,595,931

[45] Date of Patent: Jun. 17, 1986

[54] RECORDING METHOD

[75] Inventors: Shigeo Toganoh; Ryuichi Arai, both of Tokyo, Japan

[73] Assignee: Canon Kabushiki Kaisha, Tokyo, Japan

[21] Appl. No.: 585,246

[22] Filed: Mar. 1, 1984

[30] Foreign Application Priority Data

Mar. 19, 1983 [JP] Japan ........................ 58-46702

[51] Int. Cl.[4] ........................ G01D 15/16

[52] U.S. Cl. ........................ 346/1.1; 156/230; 156/247; 346/25; 346/140 R

[58] Field of Search ........................ 346/1.1, 25, 135.1, 346/140, 146; 156/230, 247, 234, 238

[56] References Cited

U.S. PATENT DOCUMENTS

| | | | |
|---|---|---|---|
| 3,547,753 | 12/1970 | Sutton | 156/230 X |
| 3,549,447 | 12/1970 | Bresnick | 346/25 X |
| 3,690,983 | 9/1972 | Claeys | 156/247 X |
| 4,060,441 | 11/1977 | Ohta | 156/234 |
| 4,463,361 | 7/1984 | Koumura | 346/140 X |
| 4,521,785 | 6/1985 | Matsufuji | 346/25 |

*Primary Examiner*—Joseph W. Hartary

*Attorney, Agent, or Firm*—Fitzpatrick, Cella, Harper & Scinto

[57] ABSTRACT

A recording method comprises recording an image on a material with a recording liquid, then laminating a transfer material carried onto a substrate on the recorded surface to have the transfer material pressure contacted thereon and thereafter separating the substrate so as to have the transfer material remain on the material carrying the recording.

9 Claims, 2 Drawing Figures

RECORDING METHOD

BACKGROUND OF THE INVENTION

1. Field of the Invention

This invention relates to a recording method using a recording liquid, particularly to an improvement in a method according to ink jet system.

2. Descrition of the Prior Art

Ink jet recording, which performs recording by forming ink droplets according to various ink discharging systems (for example, an electrostatic attracting system, a system of imparting mechanical vibrations or displacements by use of a piezoelectric element, a system utilizing the pressure generated caused by an ink bubble by heating, and others are known) and attaching a part or the whole of the droplets on a material to be recorded such as paper (hereinafter abbreviated as recording paper), is now attracting attention as the recording method which generates little noise and is capable of performing high speed printing as well as multi-color printing.

As the recording liquid for ink jet recording, aqueous liquids have been primarily used from the aspects of safety and printing characteristics. In carrying out recording with the use of a liquid ink, it is generally required that the recording liquid should not be blurred on the surface of the recording paper so as to make the printed letters indistinct, and also that the ink should be dried as soon as possible after recording so as to avoid incidental contamination of the surface of the recording paper. And, in a multi-color ink jet recording system employing two or more different color inks, since the amount of the ink attached to the surface of recording paper is increased, recourse is made particularly to a recording paper with increased ink absorptive power.

As described above, the recording paper to be used in ink jet recording is required to have high ink absorptive power and hence it is porous with low surface luster. Besides, recording with an aqueous ink gives only images on the recording paper to be used in ink jet recording, which are also low in luster.

As one method for imparting luster to recordings known in the prior art, that is, after images are recorded with a recording ink on a recording paper, luster liquid is applied to the recording by spray coating or barcoater coating. However, in such a luster liquid coating method, since the recording paper is porous, the luster liquid also penetrates into the recording paper. Therefore, a large amount of luster liquid is necessary for obtaining a desired luster. As another disadvantage, luster liquid penetrates into the recording paper in an amount more than necessary to result in increase of light transmission of the recording paper, whereby the whiteness of the paper is lowered. It is also difficult to control the desired luster, and further it is required to use an organic solvent in a luster liquid so that the dye forming the recorded images may not be dissolved in the luster liquid, which also poses a problem in safety. Thus, various disadvantages are involved.

SUMMARY OF THE INVENTION

An object of the present invention is to provide a recording method with a recording liquid, which has improved over the above-mentioned disadvantages seen in the luster liquid coating method and is capable of easily obtaining any desired luster with a dry system and, particularly a method for imparting luster in ink jet recording.

According to the present invention, there is provided a recording method which comprises recording an image on a material on which to be recorded with a recording liquid, then laminating a transfer material carried on a substrate on the recorded surface to have said transfer material pressure contacted thereon, and thereafter separating said substrate thereby to have said transfer material remain on said material on which to be recorded.

DESCRIPTION OF THE PREFERRED EMBODIMENTS

Figure 1:
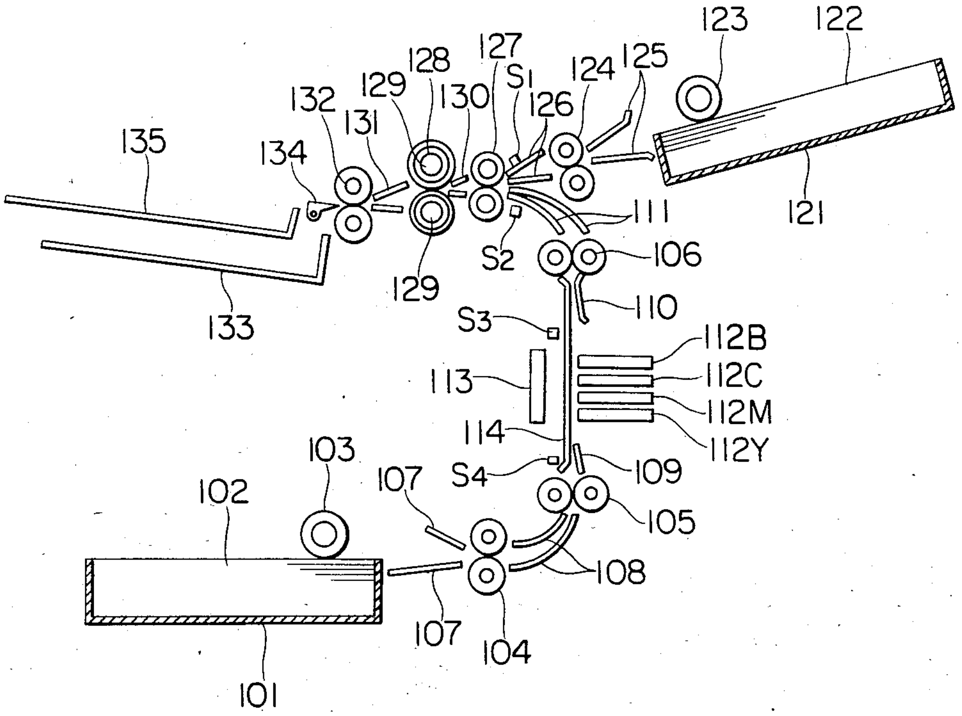
FIG. 1 shows a schematic illustration of an internal configuration of an embodiment of a recording device to which the present invention is applied.

Referring now to the drawings and embodiments, the present invention is described in detail.

FIG. 1 shows an embodiment of a multi-color ink jet recording device to which the recording method of the present invention is applied. In FIG. 1, 101 is a recording paper cassette housing recording paper 102 therein, and 103 is a paper feed roller for feeding the recording paper 102. 104 is a pair of resist rollers, 105 and 106 are pairs of conveyor rollers for conveying the recording paper 102, and 107, 108, 109, 110 and 111 are conveying guides for making conveying of the recording paper smooth. 112Y, 112M, 112C and 112B are ink jet recording heads for discharging color inks of yellow, magenta, cyan, and black, respectively, to the recording paper 102, and they effect reproductive recording of color images with these inks on the recording paper 102, based on image signals from an image-reading means not shown in FIG. 1. These recording heads are constructed for example, as a so-called full-multihead, in which they are arranged on a full-line in the direction substantially perpendicular to the conveying direction of the recording paper 102, namely the direction vertical to the plane of the paper in FIG. 1. 113 is an aspirating fan, 114 is a perforated guide plate, and the recording paper 102 is attracted by means of the aspirating fan 113 on the guide plate 114 to maintain the flatness of the recording paper 102, thereby maintaining the optimum distance between the recording paper 102 and the recording heads 112Y, 112M, 112C, and 112B.

As the recording paper 102 used herein, there may be included wood pulp paper, synthetic fiber paper, nonwoven fabric, woven fabric, porous film, and coated paper having pigments, adhesives, etc. applied to paper, cloth or synthetic resin film.

Next, 121 is a laminate material cassette housing a laminate material 122 therein, and 123 is a feed roller for feeding the laminate material 122.

Figure 2:
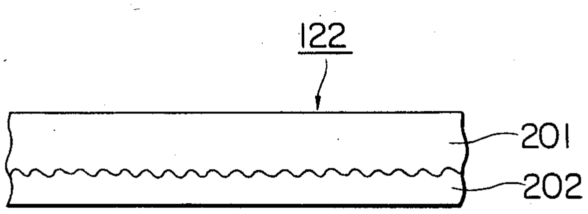
FIG. 2 is a sectional view showing a laminate material to be used in the present invention.

The laminate material 122, as shown in FIG. 2, has a transfer material 202 provided releasably on the surface of a substrate 201. The substrate may be made of paper, cloth or plastic film, of which surface is worked by coating of a release treatment agent having various releasing characterisics, such as silicon resins. Alternatively, it may also be a film having itself releasing characteristics, such as Mylar film, polypropylene film, etc. The transfer material is made primarily of a thermoplastic resin, including ethyl cellulose, vinyl acetate resin and its derivatives, polyethylene, ethylenevinyl acetate copolymers, acrylic resin, polystyrene and its copolymers, polyisobutylene, hydrocarbon resin, polypropylene, polyamide resin, polyester resin, and the like, and becomes finally light-transmissive. Otherwise, waxes, plasticizers, tackifiers, antioxidants, UV-ray absorbers, and the like may also be added.

124 is a pair of laminate material resist rollers, and 125 and 126 are conveying guides for making conveying of the laminate material smooth. 127 is a pair of conveying rollers, and, as described below, the recorded recording paper 102 is nipped into the roller pair 127 with the laminate material 122 fed from the cassette 121, which is superposed on the recorded surface. 128 is a pair of pressure rollers with built-in heaters 129, and the recorded paper 102 conveyed through the conveying roller pair 127 and the laminate material 122 are pressure contacted under heating therebetween. Thus, the laminate material 122 is stuck on the recorded surface of the recording paper 102. 130 and 131 are travelling guides, 132 a pair of discharging rollers, 133 and 135 are discharging trays, and 134 is a separating nail.

The recording paper 102 passed through the pressure roller pair 128, having the laminate material 122 stuck thereon, then passes through the discharging roller pair 132 and comes against the separating nail 134, where the substrate of the laminate material 122 not shown in FIG. 1 and the recording paper having the transfer material transferred thereon are completely separated from each other. The substrate of the laminate material 122 thus separated, after sliding over the upper side of the separating nail 134, is discharged into the discharging tray 135. On the other hand, the recording paper 102 endowed with the luster of a transfer material transferred thereon is discharged into the discharging tray 133 at the lower stage.

During this operation, the surface of the recording paper on which the transfer material has been transferred maintains substantially the surface shape or configuration of the substrate, and by using as the surface shape a desired surface roughness, any luster face can be obtained on the surface of the recording paper 102. Also, since the transfer material is not contacted directly with the pressure roller pair 128, it is possible to avoid troubles such as attachment of the transfer material to or entanglement thereof into the pressure roller pair 128.

In the FIG. 1, $S_1$ and $S_2$ are sensors provided at the upper stream of the conveying roller pair 127 for detecting the laminate material 122 and the recording paper 102, respectively, $S_3$ is a sensor for detecting the recording paper 102 conveyed toward the roller pair 106 after recording was performed by the recording heads 112Y, 112M, 112C and 112B, and $S_4$ is a sensor for detecting the recording paper 102 delivered from the conveying roller pair 105. On the basis of the detection outputs from the respective sensors $S_1$–$S_4$, the recording paper 102 and the laminate material 122 can be synchronized in the delivery thereof.

In the embodiment as described above, both the recording material and the laminate material are sheet materials, but of course both or either may be a roll material.

Also, in this embodiment, there is shown a recording device in which the recording portion and the luster-imparting portion are integrally made, but they can be separated to be independent of each other.

According to the present invention as described in detail above, images recorded with a recording liquid endowed with any desired luster can be easily obtained. In addition, recorded images with good water resistance can also be obtained, and the recorded images obtained are high in clearness.

What we claim is:

1. A recording method which comprises the steps of:
 providing at least one ink jet head for recording with a recording liquid;
 recording an image on a recording surface of a recording material with recording liquid deposited thereon by said ink jet head; and
 laminating a transfer material carried on a substrate onto said recording surface having the recorded image thereon by pressing one face of said transfer material against said recording surface and thereafter separating said substrate from said transfer material thereby to have said transfer material remain on said recording surface having the recorded image thereon, wherein said substrate is provided with a predetermined surface configuration which is imparted to the other face of said transfer material for providing said recording material with a different surface and enhancing the appearance of the recorded image.

2. A recording method according to claim 1, wherein said transfer material is a thermoplastic resin.

3. A recording method according to claim 1, wherein said transfer material is selected from the group consisting of ethyl cellulose, vinyl acetate resin and its derivatives, polyethylene, ethylene-vinyl acetate copolymers, acrylic resin, polystryrene and its copolymers, polyisobutylene, hydrocarbon resin, polypropylene, polyamide resin, and polyester resin.

4. A recording method according to claim 1, wherein said transfer material is light-transmissive.

5. A recording method according to claim 1, wherein said transfer material includes a substance selected from the group consisting of waxes, plasticizers, tackifiers, antioxidants and UV-ray absorbers.

6. A recording method according to claim 1, wherein said recording material is selected from the group consisting of wood pulp paper, synthetic fiber paper, nonwoven fabric, woven fabric, porous film and coated paper comprising pigments or adhesives applied to paper, cloth or a synthetic resin film.

7. A recording method according to claim 1, wherein said substrate is selected from the group consisting of paper, cloth and plastic film having the surface carrying said transfer material coated with a releasing agent.

8. A recording method according to claim 1, wherein said substrate is a substance with releasing characteristics for facilitating the separation of said transfer material and said substrate.

9. A recording method according to claim 1, wherein the surface of said substrate carrying said transfer material has a roughened surface.

* * * * *